United States Patent [19]

Sonobe et al.

[11] Patent Number: 4,739,230
[45] Date of Patent: Apr. 19, 1988

[54] CONTROL DEVICE FOR CONTROLLING MOTOR SPEED WITHOUT HUNTING

[75] Inventors: Hiraku Sonobe; Ken Miyagi, both of Yokohama, Japan

[73] Assignee: Canon Kabushiki Kaisha, Tokyo, Japan

[21] Appl. No.: 929,492

[22] Filed: Nov. 12, 1986

Related U.S. Application Data

[63] Continuation of Ser. No. 740,319, Jun. 3, 1985, abandoned, which is a continuation of Ser. No. 510,680, Jul. 5, 1983, abandoned.

[30] Foreign Application Priority Data

Jul. 6, 1982 [JP] Japan ................................ 57-118238

[51] Int. Cl.$^4$ .............................................. H02P 5/00
[52] U.S. Cl. ..................................... 318/301; 318/138; 318/314; 318/317; 318/341; 318/636; 318/461; 355/3 R
[58] Field of Search ............... 318/312, 314, 317, 318, 318/326, 327, 328, 332, 341, 599, 606, 607, 608, 612, 611, 615, 616, 617, 618, 628, 632, 301; 355/14 R, 3 R

[56] References Cited

U.S. PATENT DOCUMENTS

| | | | |
|---|---|---|---|
| 3,176,208 | 3/1965 | Gifft | 318/314 |
| 3,309,597 | 3/1967 | Gabor et al. | 318/393 |
| 3,706,020 | 12/1972 | Klang | 318/400 X |
| 3,836,833 | 9/1974 | Harris et al. | 318/398 X |
| 3,906,319 | 9/1975 | Milligan | 318/327 X |
| 3,917,989 | 11/1975 | Bereisa | 318/398 X |
| 3,942,084 | 3/1976 | Louth | 318/138 |
| 3,943,421 | 3/1976 | Shibata et al. | 318/305 X |
| 3,953,776 | 4/1976 | Wolf | 318/328 X |
| 4,088,932 | 5/1978 | Okuyama et al. | 318/138 |
| 4,193,020 | 3/1980 | Song | 318/341 X |
| 4,250,435 | 2/1981 | Alley et al. | 318/254 X |
| 4,311,949 | 1/1982 | Pelkmann et al. | 318/318 X |
| 4,406,981 | 9/1983 | Watanabe et al. | 318/318 X |
| 4,473,783 | 9/1984 | Vermesse | 318/331 |
| 4,514,672 | 4/1985 | O'Gwynn | 318/618 X |
| 4,572,995 | 2/1986 | Enami | 318/606 X |
| 4,605,884 | 8/1986 | Miyagi | 318/317 X |

Primary Examiner—William M. Shoop, Jr.
Assistant Examiner—Paul Ip
Attorney, Agent, or Firm—Fitzpatrick, Cella, Harper & Scinto

[57] ABSTRACT

A control device for use in maintaining a constant driving speed in various rotational objects such as a photosensitive drum, etc. for an electrophotographic reproduction apparatus, the control device being constructed with a driving device; a detecting device to sense a driving condition of the driving device; first and second control devices to drive control the driving device; and a change-over device to change the drive-control of the driving device from the first control device over to the second control device in accordance with an output from the detecting device, thereby quickly bringing the driving condition of the rotating object back to its original controlled condition, even under abrupt variations in the load imposed thereon.

12 Claims, 6 Drawing Sheets

CONTROL DEVICE FOR CONTROLLING MOTOR SPEED WITHOUT HUNTING

This is a continuation of application Ser. No. 740,319, filed June 3, 1985 and now abandoned, which in turn was a continuation of application Ser. No. 510,680, filed July 5, 1983, and now abandoned.

BACKGROUND OF THE INVENTION

1. Field of the Invention

This invention relates to a control device which drives controllably a recording medium such as recording paper and photosensitive drum.

2. Description of the Prior Art

As a conventionally known type of the drive-control device for a recording medium, explanation will be given hereinbelow in reference to FIGS. 1a, 1b and 1c and 2 of the accompanying drawing taking a laser beam printer as an example, wherein a laser beam modulated by recording signals scans the surface of a photosensitive drum rotating at a constant rotational speed to thereby record informations on the photosensitive drum in the form of a latent image, and then this latent image is developed with a toner, followed by transfer of the developed image onto the recording sheet.

Figure 1A:
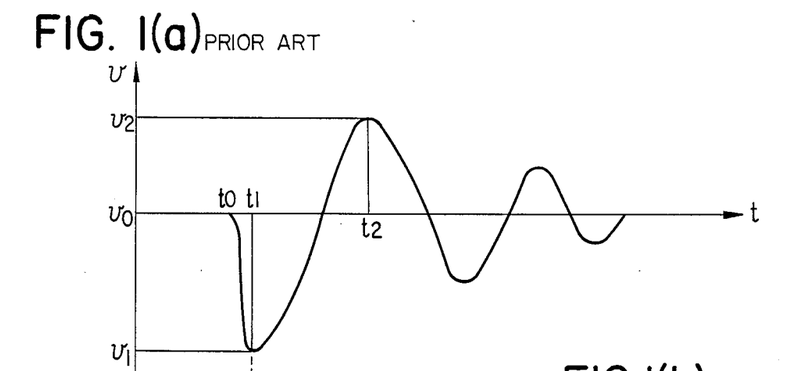
FIG. 1(a) is a speed diagram.
Figure 1B:
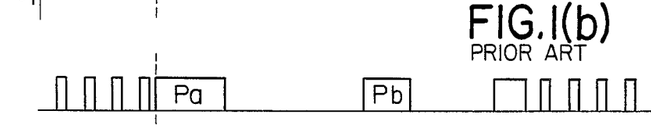
FIG. 1(b) is a drive pulse waveform diagram.

That is to say, FIG. 1(a) illustrates changes in the rotational speed of the photosensitive drum, wherein the abscissa denotes a time t and the ordinate represents a rotational speed $v$ with $v_0$ as a preset rotational speed. Now assume that, at a time instant $t_0$, the rotational speed slows down to $v_1$ due to abrupt change in load applied thereto. Then, at time $t_1$, a control circuit starts its control action and imparts to a motor for driving the photosensitive drum a drive pulse Pa as shown in FIG. 1(b) in accordance with a width in variation of the rotational speed ($v_0 - v_1$). However, when an excessive pulse Pa is imparted to the motor, there takes place a hunting phenomenon, by which the rotational speed exceeds the preset speed $v_0$ at the time instant $t_2$ and reaches a speed $v_2$. At this instant, the current supply to the motor is interrupted for an instant until the drum reduces its rotational speed. On the contrary, however, when the rotational speed becomes too slow, another pulse Pb as shown in FIG. 1(b) is imparted to the motor. By repeating such pulse imparting actions, the conventional control device managed to bring the rotational speed of the drum closer to its ideal value $v_0$.

Figure 1C:
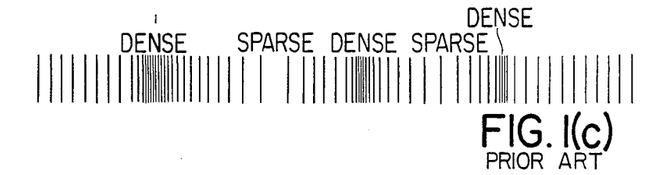
FIG. 1(c) is a density diagram of a recorded image.

FIG. 1(c) shows irregularities in density of an image produced by the repetitive pulse imparting and non-imparting operations. As will be seen from the illustration, since it is due to density variations in the auxiliary scanning direction caused by speed variations in the auxiliary scanning direction that the irregularities in the drum rotation results in the image density irregularities, the density in image varies in a recurring pattern of "dense, sparse, dense, sparse, . . ." due to the hunting phenomenon as shown in FIG. 1(c) with the result that such recurring "dense-sparse" pattern is seen as the irregularities in the image density. With such sparse portions in the produced image, the density variations become more conspicuous upon comparing them with the dense portions.

SUMMARY OF THE INVENTION

It is the primary object of the present invention to provide an improved control device, from which the afore-described defects have been perfectly eliminated.

It is another object of the present invention to provide a control device capable of limiting the irregularities in movement of those movable members to a minimum.

Figure 3A:
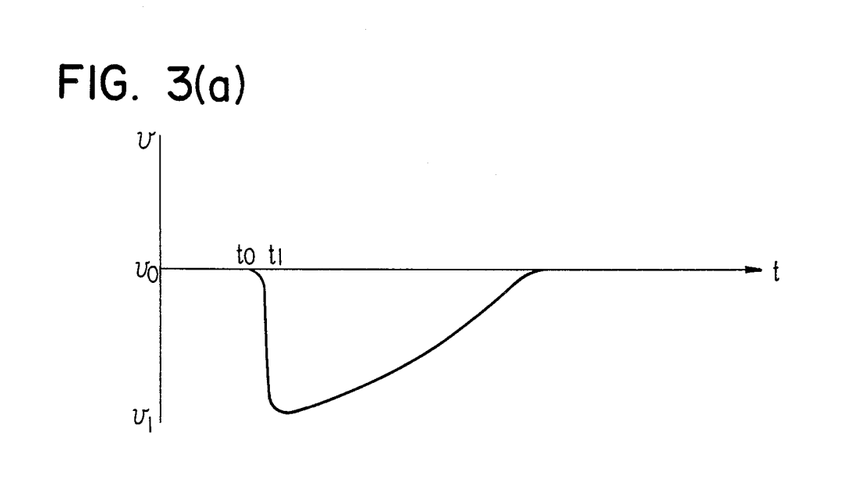
FIG. 3(a) is a speed diagram.
Figure 3B:
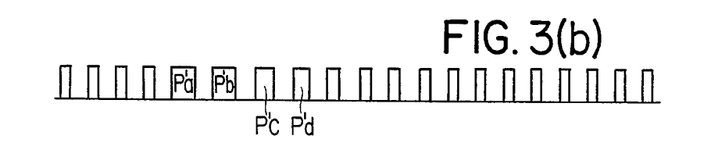
FIG. 3(b) is a drive pulse waveform diagram.
Figure 3C:
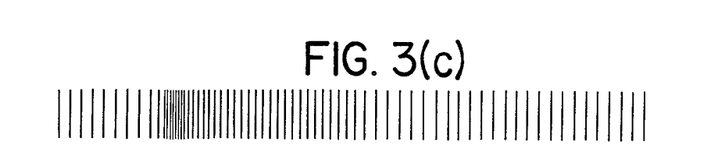
FIG. 3(c) is a density diagram of a recorded image.

It is still another object of the present invention to provide a control device, in which the density variations in the auxiliary scanning direction are reduced as shown in FIGS. 3a, 3b and 3c.

It is another object of the present invention to provide a control device capable of effecting stabilized drive-control operations.

It is still other object of the present invention to provide a control device which is able to return quickly to its original state, even when load variations, etc. take place.

According to the present invention, in a general aspect thereof, there is provide a control device, which comprises: a drive means; a detection means for detecting a condition of driving of said drive means; first and second control means for effecting drive-control of said drive means; and change-over means for changing the drive-control in said drive means from said first control means over to said second control means in accordance with an output from said detection means.

The foregoing objects, other objects as well as specific constructions and functions of the control device according to the present invention will become more apparent and understandable from the following detailed description thereof, when read in connection with the accompanying drawing.

BRIEF DESCRIPTION OF THE ACCOMPANYING DRAWING

In the drawing:

FIGS. 1(a), 1(b) and 1(c) are respectively diagrams for explaining the operations of the conventional recording medium drive-control device, in which

FIGS. 3(a), 3(b) and 3(c) are respectively diagrams for explaining the operations of the control device according to the present invention, in which

DETAILED DESCRIPTION OF THE PREFERRED EMBODIMENTS

In the following, the present invention will be described in detail in reference to a preferred embodiment thereof shown in the accompanying drawing.

Figure 2:
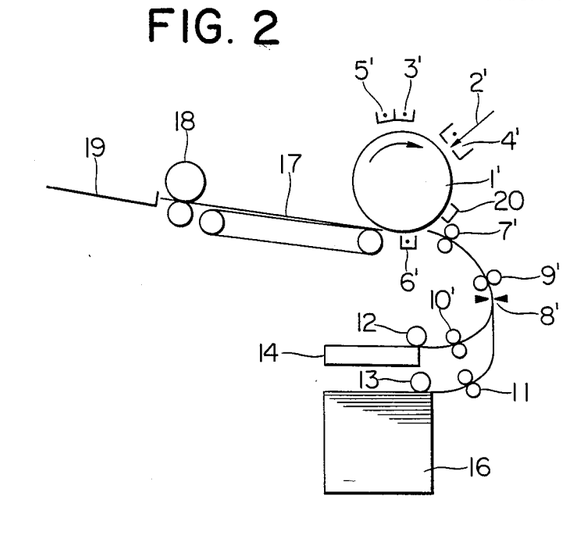
FIG. 2 is a side elevational view of a recording device, to which the control device according to the present invention is applied.

FIG. 2 is a schematic structural diagram showing a laser beam printer, to which the control device of the present invention is applied. In the drawing, a reference numeral 1' designates a rotational photosensitive drum which rotates in the direction of an arrow mark. A laser beam which has been modulated with image data sent from a host computer (not shown in the drawing) connected with the laser beam printer is irradiated onto the surface of the rotational photosensitive drum 1' in a manner as designated by an arrow 2', and is simultaneously caused to scan thereon in the direction perpendicular to the rotating direction of the drum (or in the direction parallel to the rotational axis of the drum) at a rate of, for example, 20,000 revolutions or so per minute. Further, with a view to forming a latent image corresponding to the laser beam on the drum surface, there are disposed, at appropriate positions around the drum, a pre-charge-remover 5', a primary charger 3', a secondary charger 4' and a developer 20. In this laser beam printer, image recording paper can be fed either from a paper feeding deck 16 or from a paper feeding cassette 14. The recording paper can be fed by a paper feeding roller 13 (or 12) which rotates at a predetermined timing in synchronism with the drum rotation. The paper thus fed is subjected to the initial positioning of its forward edge by means of registration rollers 11 (or 10), after which a timing adjustment between the paper and the latent image on the drum surface and the final registration of the forward edge of the paper are carried out by means of timing rollers 7' via conveying rollers 9'. The paper which has been sent out by rotation of the timing rollers 7' receives on its surface by image transfer operation the latent image on the drum surface by means of an image transfer charger 6', and thereafter it is forwarded to an image fixing device on the conveying belt 17. After the image fixing by the image fixing rollers 18, the image-recorded paper is discharged into a receiving tray 19. Incidentally, it should be noted that this rotational drum 1' is driven at a constant rotational speed by means of an electric motor (not shown).

Figure 4:
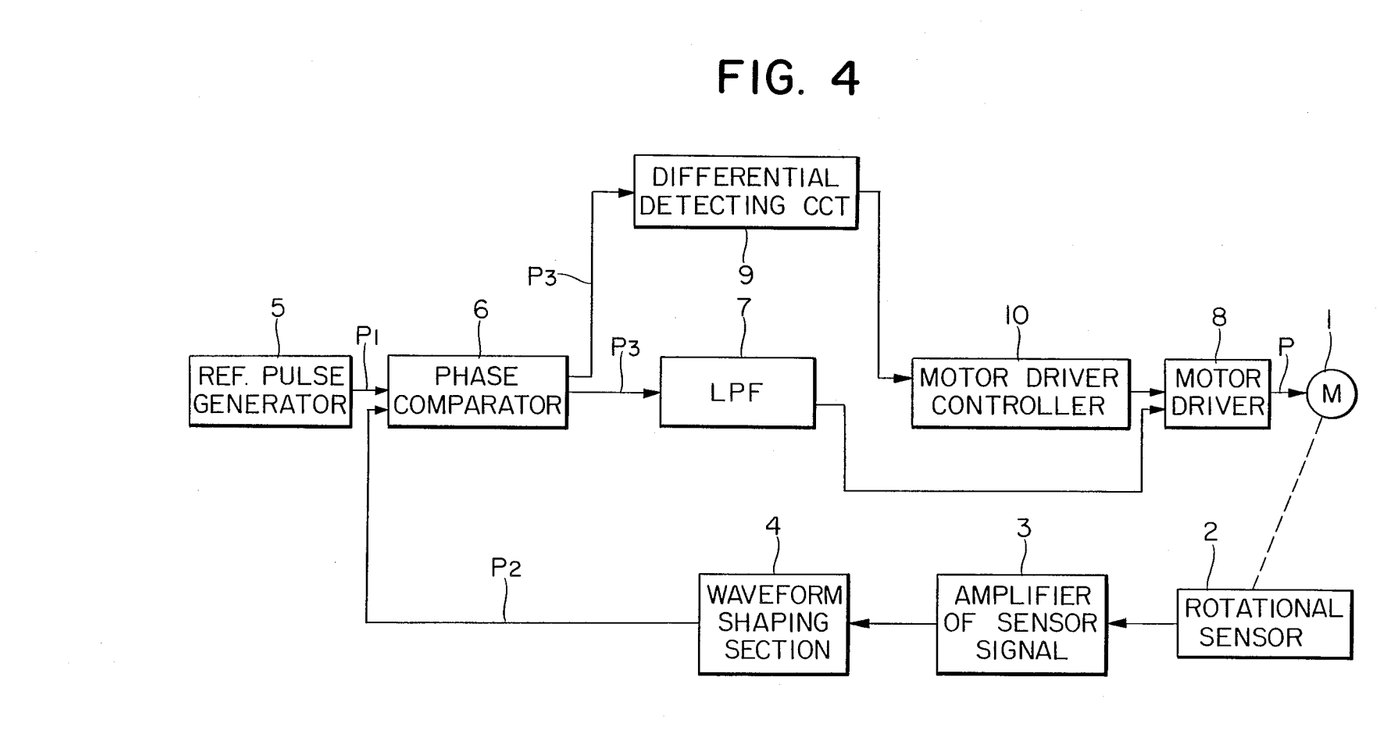
FIG. 4 is a block diagram for the circuit of the control device according to the present invention.

The driving device for the laser beam printer as mentioned in the preceding is constructed as shown in FIG. 4, the operations of which will be outlined in the following in the initial reference to FIGS. 3(a), 3(b) and 3(c).

As is the case with FIGS. 1(a), 1(b) and 1(c), it is assumed that the rotational speed of the photosensitive drum has slowed down to a value $v_1$ due to abrupt changes in the load imposed on it. At this instant, a control pulse of an appropriate pulse width as shown in FIG. 3(b) is given to the motor by means of the control circuit at a time instant $t_1$ to gradually bring the rotational speed closer to the ideal value $v_0$, while progressively decreasing the pulse width as "Pa', Pb', Pc', Pd', ...". FIG. 3(c) indicates irregularities in density of the reproduced image in this instance.

In the above-mentioned manner, the control device according to the present invention controls the rotational speed of the drum so that it may be gradually brought closer to a predetermined rotational speed. Such speed control operation can be effected by the device as shown in FIG. 4, hence explanations hereinbelow will be made in reference to this figure of the drawing.

A pulse signal generated from a rotational sensor 2 (such as an encoder, a tacho-generator, etc.) which is provided coaxially or otherwise with the DC motor 1 to drive the photosensitive drum is amplified by an amplifier 3 and shaped by a waveform shaper 4 into a rectangular waveform, etc. to thereby obtain a signal P2. Further, with a view to comparing this signal P2 with a reference pulse P1 produced at a reference pulse generator 5, the two pulses P1 and P2 are introduced into a phase comparator 6, from which is produced an output pulse P3 corresponding to a phase difference of the sensor output signal P2 with respect to the reference pulse P1.

In the phase comparator 6, when there is a phase difference greater than a certain predetermined value, a phase differential quantity of the pulse (rate of change) is detected by a differential detecting circuit 9. And, in accordance with such phase differential quantity (rate of change), the pulse width of the pulse P is controlled by means of a motor driver controller 10, while a circuit passing through a low-pass filter 7 is shut off. In this motor driver controller 10, there is stored beforehand a modified signal such as, for example, the modified signal as shown in FIG. 3(b), which is to be output with respect to combinations of various phase differential quantities (rates of change), and such modified signal is applied to a motor driver 8. By the way, this modified signal is such that it is predetermined so as not to bring about the undesirable hunting phenomenon. However, when the phase difference is small, the signal P from the phase comparator 6 is used as it is, and the signal is applied as the modified signal to the motor driver 8 through the low-pass filter 7, as is the case with the conventional device, to thereby drive the motor. Thus, use of the above-mentioned driving device makes it possible to supply the pulse P to the motor 1 so as to promptly reinstate the changed rotational speed, when such change is small, to a predetermined speed, and to supply to the motor 1 a pulse produced in response to a large variation in the rotational speed to gradually reinstate the speed to the predetermined speed so as to make less noticeable the irregularities in the reproduced image density.

Figure 5:
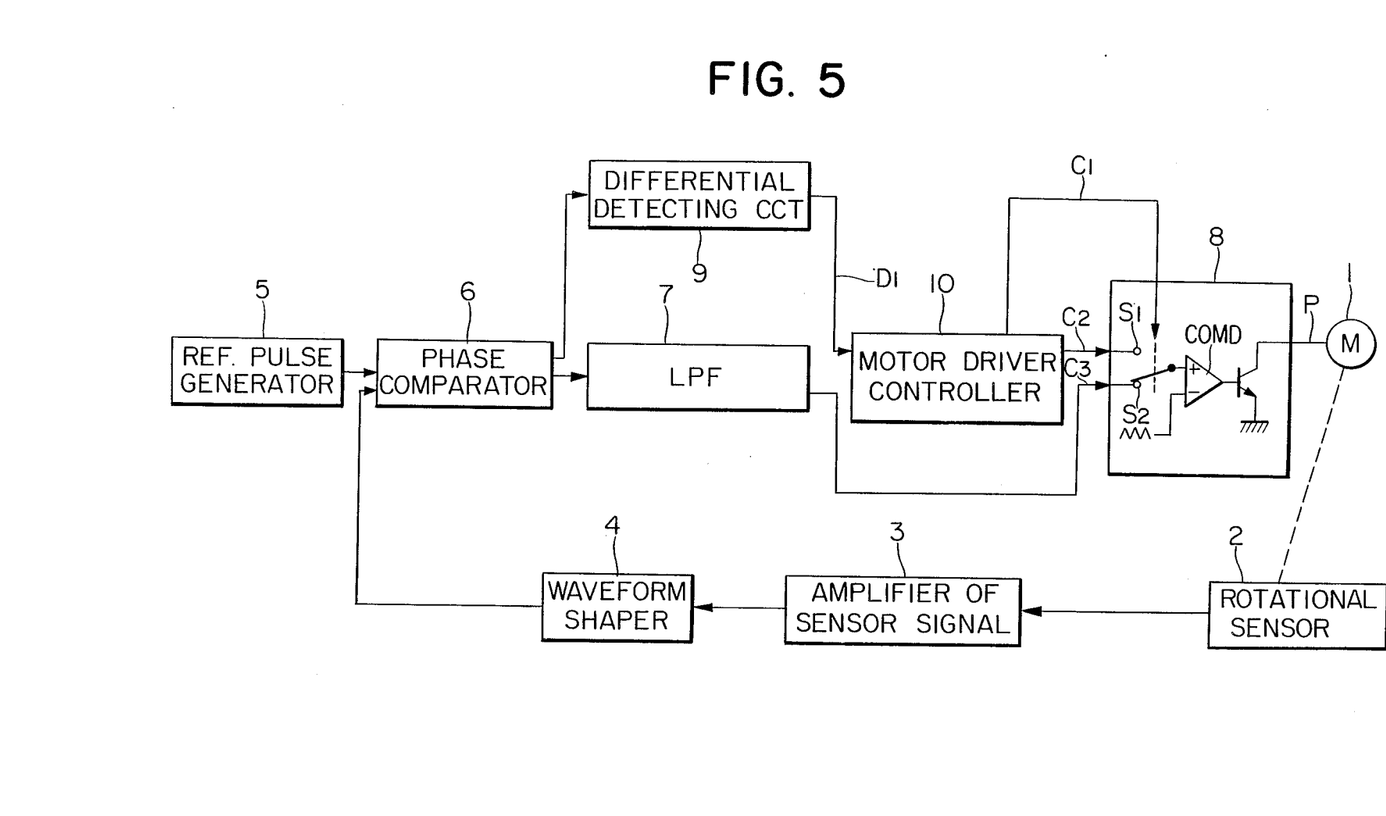
FIG. 5 is a detail of the circuit diagram shown in FIG. 4.

FIG. 5 is a further detail of the circuit shown in FIG. 4 above. The following description will be made on this figure of the drawing.

In the drawing, the motor driver controller 10 monitors a phase differential quantity (rate of change) within a predetermined time to be detected by the differential detecting circuit 9. When this rate of change is above a certain established value, a control signal C1 is output to the motor driver 8. This motor driver 8 is so constructed that, when the control signal C1 is output, it changes the contact from S2 over to S1.

Figures 6A, 6B:
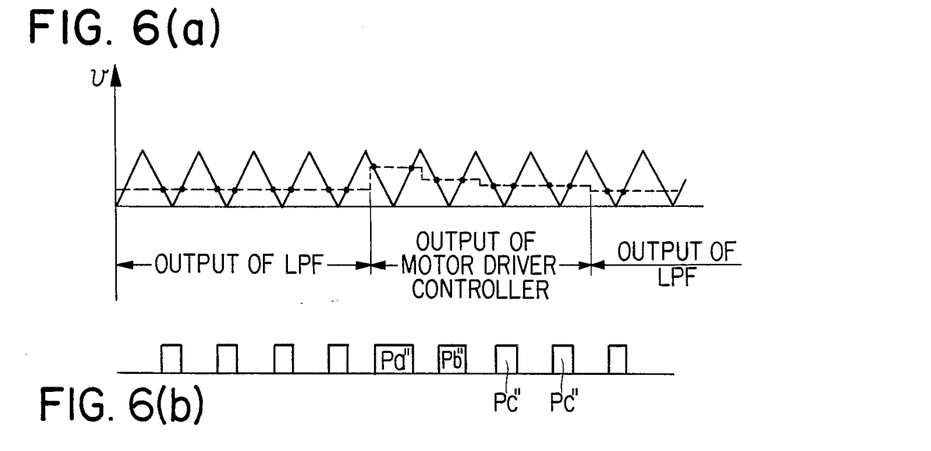
FIGS. 6(a) and 6(b) are diagrams for explaining a method of generating drive pulses.

As indicated with solid lines in FIG. 6(a), a saw-tooth waveform is applied to the negative (−) terminal of the comparator COMD in the motor driver 8, while a DC voltage as indicated with broken lines in FIG. 6(a) is applied to the positive (+) terminal thereof from the contact S1 or S2. As the result of this, a pulse width of the input pulse P into the motor 1 is controlled, as shown in FIG. 6(b), depending on the magnitude of the DC voltage to be applied to the positive (+) terminal.

The above-mentioned embodiment according to the present invention controls the motor 1 by regulating the DC voltage to be applied to the positive (+) terminals of the comparator COMD so that no hunting phenomenon may take place.

Figure 7:
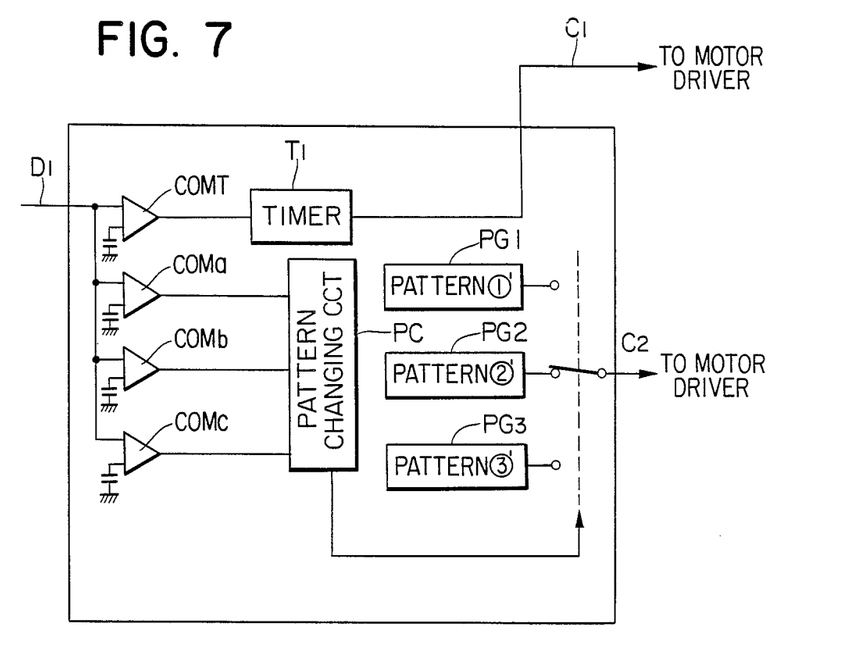
FIG. 7 is a detailed circuit construction of a motor driver controller.

In the following, explanations will be given as to the motor driver controller 10 of a construction as shown, for example, in FIG. 7.

In the drawing, COMT refers to a comparator for making a judgement on whether an output D1 (rate of change) from the differential detecting circuit 9 is above the predetermined value, or not. When the rate of change D1 exceeds the set value, a timer T1 is operated by an output from the comparator COMT. This timer T1 is to impart an output C2 from the motor driver controller 10 to the motor driver 8 for a pre-determined time, in place of an output from the low-pass filter 7.

Figure 8:
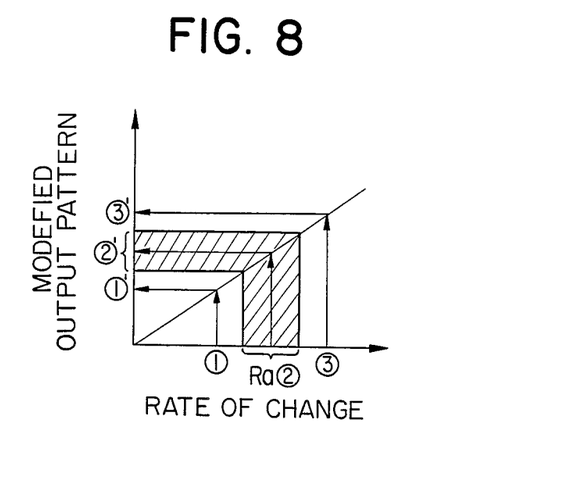
FIG. 8 is a graphical representation showing a relationship between a rate of change in rotational speed and a modified output pattern to be selected.
Figure 9:
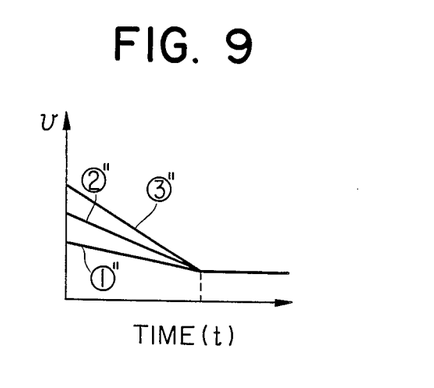
FIG. 9 is a graphical representation showing output patterns from pattern generating circuits in the motor driver controller.

Furthermore, the output D1 (rate of change) from the differential detecting circuit 9 is introduced as an input into the comparator COMT, and also into other comparators COMa to COMc, each being compared with a reference level of each comparator. Then, in accordance with the rate of change (output from each comparator), a pattern change-over circuit PC is operated to select any one of pattern generating circuits PG1 to PG3. From the thus selected pattern generating circuit, a patternized voltage C2 is output to the motor driver 8 during the operation of the timer T1. FIGS. 8 and 9 denote this situation.

In FIG. 8, if the output (rate of change) D1 from the differential detection circuit is ②, the modified output pattern is determined to be ②', whereby a pattern generating circuit PG2 having the modified output pattern ②' is selected. From the pattern generating circuit PG2, an output voltage of a pattern as shown by ②" in FIG. 9 is produced for a predetermined time. Since this output is compared with the afore-mentioned saw-tooth waveform as shown in FIG. 6 and the pulse width thereof becomes gradually smaller as Pa", Pb", Pc", . . . as shown, for example, in FIG. 6(b), the motor 1 gradually returns to its ideal rotational speed without bringing about the hunting phenomenon.

Incidentally, in this embodiment of the present invention, the device is so constructed that threestage patterns may be generated in accordance with the rate of change. Therefore, the reference value, etc. of each comparator may be so determined that the modified output pattern ②' may be selected when the rate of change is, for example, within a region of Ra shaded with diagonal lines in FIG. 8. Furthermore, the patterns may be provided in more than three stages.

The pattern generating circuit may be constructed with, for example, an integration circuit, etc., the voltage of which is determined by each constant of a capacitor C and a resistor R. Moreover, in the present embodiment, the motor driver controller is constructed as shown in FIG. 7, but it may be constructed with use of a micro-computer. In addition, the present embodiment is so designed that the pattern generating circuit may be selected in accordance with the rate of change, but, instead of selecting the pattern generating circuit, the operating time of the timer T1 may be selected. Further, when the device is so constructed that both operating time of the timer T1 and pattern generating circuit may be selected, it becomes possible to choose the most adequate combination of the modified output patterns. Furthermore, in this embodiment of the present invention, the rotational speed of the motor is controlled by controlling the width of the drive pulse, although this drive-control may also be done by imparting an analog output to the motor.

Finally, it should be noted that the present invention can be used not only for the control device of the photosensitive drum, but also for other control devices such as, for example, control device of a scanning optical system in a reproduction apparatus, etc.

According to the present invention which has so been described in the foregoing, the rotational speed of the motor can be quickly brought back to its original controlled state without causing the hunting phenomenon, even if variations in the load have taken place.

Although, in the foregoing, the present invention has been explained in detail with reference to a preferred embodiment thereof, it should be understood that the embodiment is merely illustrative and not limiting, and that any changes and modifications may be made by those skilled in the art within the ambit of the present invention as recited in the appended claims.

What we claim is:

1. A motor control device comprising:
   a motor;
   speed detection means for detecting the rotating speed of said motor;
   variation detecting means for detecting whether or not variation in the speed of said motor is out of predetermined range on driving said motor in a steady state;
   first drive means responsive to the detection output from said speed detection means for drivng said motor to regulate the speed of said motor when said variation detecting means detects that the variation in the speed of said motor is within the predetermined range; and
   second drive means having means for generating a predetermined pattern signal;
   wherein said variation detecting means detects whether or not variation in the speed of motor is out of the predetermined range utilizing an output from said first drive means; and
   said second drive means provides a predetermined output to said motor in accordance with said predetermined pattern signal during resumption of a steady state in the speed of said motor when said variation detecting means detects that the variation is out of the predetermined range.

2. A motor control device according to claim 1, further comprising reference signal forming means for forming a reference signal, wherein said first drive means compares a phase of the reference signal from said reference signal forming means and a phase of the detection output from said detection means, thereby effecting the drive-control of said motor.

3. A motor control device according to claim 2, wherein said detection means includes pulse signal generating means to generate pulse signals following the driving of said motor, and said first drive means detects a difference in phase between the reference pulse signal generated from said reference signal forming means and the pulse signal generated from said pulse signal generating means so as to drive said motor in accordance with the phase difference as detected.

4. A motor control device according to claim 3, wherein said variation detection means includes change-rate detection means for detecting a rate of change of the output from said first drive means within a predetermined time, and changes over said first drive means to said second drive means in accordance with a detected change-rate.

5. A motor control device according to claim 1 wherein said pattern signal generating means is arranged to form a plurality of kinds of pattern signals and said second drive means selects one of said plurality of kinds of pattern signals in accordance with a detection output from said variation detecting means.

6. A motor control device according to claim 5, wherein said second drive means includes a timer for producing said pattern signal output for a predetermined time period.

7. A motor control device according to claim 1, wherein said motor is a DC motor for driving a photosensitive drum for image formation.

8. A motor control device comprising:
a motor;
speed detection means for detecting the rotating speed of said motor;
variation detecting means for detecting whether or not variation in the speed of said motor is out of a predetermined range on driving said motor in a steady state; and
drive means, having first and second modes, for driving said motor to regulate the speed of said motor, said drive means including pattern signal generating means for generating a predetermined pattern signal,
wherein said variation detecting means detects whether or not variation in the speed of said motor is out of the predetermined range utilizing an output from said drive means, and wherein said first mode is provided for driving said motor in accordance with the detection output from said speed detection means when said variation detecting means detects that the variation in the speed of said motor is within the predetermined range, and said second mode is provided for driving said motor by using a predetermined output in accordance with said predetermined pattern signal, when said variation detecting means detects that the variation in the speed of said motor is out of the predetermined range.

9. A motor control device according to claim 8, wherein said pattern signal generating means is arranged to form a plurality of types of pattern signals and select one of said plurality of the pattern signals so as to drive said motor.

10. A motor control device according to claim 9, further comprising reference signal forming means for forming a reference signal, wherein in said first control mode said drive means compares a phase of the reference signal from said reference signal forming means and a phase of the detection output from said detection means, thereby effecting the drive control of said motor.

11. A motor pattern device according to claim 10, wherein in said second control mode said drive means includes a timer for producing said selected control signal for a predetermined time period.

12. A motor control device according to claim 8, wherein said motor is a DC motor for driving a photosensitive drum for image formation.

* * * * *

UNITED STATES PATENT AND TRADEMARK OFFICE
CERTIFICATE OF CORRECTION

PATENT NO. : 4,739,230

DATED : April 19, 1988

INVENTOR(S) : HIRAKU SONOBE, ET AL.

It is certified that error appears in the above-identified patent and that said Letters Patent is hereby corrected as shown below:

[57], ABSTRACT, line 7, "drive control" should read --drive-control--.

Column 1, line 18, "FIGS. 1a, 1b and 1c" should read --FIGS. 1(a) 1(b), 1(c)--.

Column 2, line 8, "FIGS. 3a, 3b and 3c" should read --FIGS. 3(a), 3(b) and 3(c)--;

line 13, "other" should read --another--;

line 18, "provide" should read --provided--.

Column 5, line 13, "pre-determined" should read --predetermined--;

line 41, "threestage" should read --three-stage--.

Column 6, line 25, "predetermined" should read --a predetermined--;

line 28, "drivng" should read --driving--.

UNITED STATES PATENT AND TRADEMARK OFFICE
CERTIFICATE OF CORRECTION

PATENT NO. : 4,739,230

DATED : April 19, 1988

INVENTOR(S) : HIRAKU SONOBE, ET AL.

It is certified that error appears in the above-identified patent and that said Letters Patent is hereby corrected as shown below:

Column 7, line 1, "claim 1" should read --claim 1,--;

line 9, "output" should be deleted.

Column 8, line 24, "pattern" should read --control--;

line 26, "control" should read --pattern--.

IN THE DRAWING:

Sheet 6,

Fig. 8, "MODEFIED" should read --MODIFIED--.

Signed and Sealed this

Twenty-seventh Day of September, 1988

Attest:

DONALD J. QUIGG

*Attesting Officer*       *Commissioner of Patents and Trademarks*